US008829405B2

(12) United States Patent
Buehring

(10) Patent No.: US 8,829,405 B2
(45) Date of Patent: Sep. 9, 2014

(54) POSITION REFERENCE SENSOR

(75) Inventor: Ian Buehring, Leicester (GB)

(73) Assignee: Guidance IP Limited, Liecester (GB)

( * ) Notice: Subject to any disclaimer, the term of this patent is extended or adjusted under 35 U.S.C. 154(b) by 435 days.

(21) Appl. No.: 13/497,207

(22) PCT Filed: Sep. 20, 2010

(86) PCT No.: PCT/GB2010/001752
§ 371 (c)(1),
(2), (4) Date: May 29, 2012

(87) PCT Pub. No.: WO2011/036434
PCT Pub. Date: Mar. 31, 2011

(65) Prior Publication Data
US 2012/0228469 A1    Sep. 13, 2012

(30) Foreign Application Priority Data

Sep. 22, 2009  (GB) .................................. 0916584.6

(51) Int. Cl.
*G01J 1/20*  (2006.01)
*G01S 17/48*  (2006.01)
(52) U.S. Cl.
CPC ..................................... *G01S 17/48* (2013.01)
USPC ........... 250/203.2; 356/5.02; 701/1; 340/851; 340/903
(58) Field of Classification Search
USPC ............. 250/203.1, 203.2, 208.2, 208.6, 221; 356/4.07, 5.02, 139.1, 141.1; 340/435, 340/436, 851, 903, 932, 985, 991, 992; 73/1, 13
See application file for complete search history.

(56) References Cited

U.S. PATENT DOCUMENTS

| 3,690,767 | A |   | 9/1972  | Missio et al. |
| 5,113,065 | A |   | 5/1992  | Heynau |
| 5,898,490 | A | * | 4/1999  | Ohtomo et al. ............ 356/141.3 |
| 8,310,653 | B2 | * | 11/2012 | Ogawa et al. ................ 356/4.07 |
| 2004/0222902 | A1 |   | 11/2004 | Wortsmith |
| 2008/0269965 | A1 |   | 10/2008 | Luk-Paszyc |

FOREIGN PATENT DOCUMENTS

| DE | 3305119 A1    | 8/1984 |
| GB | 1181162 A     | 2/1970 |
| GB | 1313928 A     | 4/1973 |
| JP | 56141571 A    | 11/1981 |
| JP | 04138149 A    | 5/1992 |
| WO | 2005/088343 A1 | 9/2005 |

OTHER PUBLICATIONS

Form PCT/ISA/210 mailed Jan. 17, 2011, in International Application No. PCT/GB2010/001752 (4 pages).
UK Search Report for Application No. GB0916584.6 dated Jan. 14, 2010 (1 page).

* cited by examiner

*Primary Examiner* — Kevin Pyo
(74) *Attorney, Agent, or Firm* — Kilyk & Bowersox, P.L.L.C.

(57) ABSTRACT

A position reference sensor for a marine vessel comprises an optical assembly including a pulsed laser device for emitting laser light, a lens arrangement comprising a lenticular lens for producing a vertically fanned beam (18) of the laser light emitted by the pulsed laser device and a photodiode (32) comprising a plurality of photodetectors Rx, Ry, Rz for detecting laser light (28) that has been emitted by the pulsed laser device and reflected by a retro-reflective target (22) towards the photodiode (32). The level of reflected laser light incident upon each photodetector is individually detectable and the position reference sensor further comprises an actuator for varying the inclination of the optical assembly. The actuator is automatically controllable based on the level of reflected laser light incident upon each photodetector Rx, Ry, Rz. A position reference sensor for a marine vessel comprises an optical assembly including a pulsed laser device for emitting laser light, a lens arrangement comprising a lenticular lens for producing a vertically fanned beam (18) of the laser light emitted by the pulsed laser device and a photodiode (32) comprising a plurality of photodetectors Rx, Ry, Rz for detecting laser light (28) that has been emitted by the pulsed laser device and reflected by a retro-reflective target (22) towards the photodiode (32). The level of reflected laser light incident upon each photodetector is individually detectable and the position reference sensor further comprises an actuator for varying the inclination of the optical assembly. The actuator is automatically controllable based on the level of reflected laser light incident upon each photodetector Rx, Ry, Rz.

17 Claims, 4 Drawing Sheets

POSITION REFERENCE SENSOR

FIELD OF THE INVENTION

The present invention relates generally to a position reference sensor and/or to a method for operating a position reference sensor. More particularly, embodiments of the present invention relate to a position reference sensor which directs a vertically fanned beam of pulsed laser light from a marine vessel towards one or more retro-reflective targets fixed to one or more objects and which detects laser light reflected by the one or more retro-reflective targets. The position reference sensor forms part of a dynamic positioning system which determines the position of the marine vessel relative to the one or more objects by analysing the reflected laser light detected by the position reference sensor.

BACKGROUND TO THE INVENTION

It is desirable to be able to continuously determine the position of a marine vessel relative to one or more other objects such as another marine vessel or a fixed platform, and a dynamic positioning system can be used for this purpose.

A dynamic positioning system includes a position reference sensor mounted on the marine vessel and FIGS. 1 and 2 are diagrammatic illustrations of the operation of a position reference sensor 10 in the horizontal and vertical planes respectively. The position reference sensor 10 comprises an optical assembly 12 enclosed in a housing mounted on a marine vessel 14. The optical assembly 12 includes a pulsed laser device 16 and associated optics which produce a vertically fanned beam 18 of laser light. The housing and enclosed optical assembly 12 rotate continuously about a generally vertical axis 20, as shown diagrammatically by the rotation line 24, or alternatively oscillate about a generally vertical axis, to sequentially and repeatedly direct the vertically fanned beam 18 of laser light towards retro-reflective targets 22 spaced apart horizontally and fixed to one or more objects. The optical assembly 12 also includes a photodetector 26 and associated optics, located adjacent to the pulsed laser device 16 and its associated optics. The photodetector 26 and associated optics rotate with the pulsed laser device 16 and the photodetector 26 detects laser light 28 reflected by the one or more retro-reflective targets 22.

In operation, the dynamic positioning system determines the range of each retro-reflective target 22 from the optical assembly 12, and hence from the marine vessel 14, based on the time of flight of the emitted and reflected laser light. The dynamic positioning system may also determine the bearing relative to each retro-reflective target 22 based on the rotational position of the optical assembly 12 when the reflected laser light 28 is detected by the photodetector 26. The range and bearing data are both used to determine the position of the marine vessel 14 relative to the retro-reflective targets 22 and, hence, the one or more objects.

A marine vessel 14 is subject to pitch, roll and heave motion, as induced by the prevailing sea state. Because the beam 18 of laser light is fanned (i.e. divergent) in the vertical direction, it is likely that the vertically fanned beam 18 will strike the one or more retro-reflective targets 22 if pitch, roll or heave occur. The beam divergence is, however, limited typically to about ±8° above and below a beam centre line CL (FIG. 2). A gyroscope-based motion sensor and motorised tilt mechanism are thus employed to alter the vertical inclination of the optical assembly 12, and hence the vertically fanned beam 18 of laser light, to compensate further for pitch and roll motion of the marine vessel 14. The motorised tilt mechanism is typically capable of tilting by ±20° above and below the horizontal plane.

Even with the position reference sensor 10 described above, it is possible that one or more of the retro-reflective targets 22 could move out of the field of illumination of the vertically fanned beam 18 of laser light if there is significant pitch, roll or heave motion of the marine vessel 14. It is thus possible that the position reference sensor may be rendered inoperable, even if only temporarily. There is, therefore, a need for an improved position reference sensor for a marine vessel which compensates for pitch, roll and heave motion of the marine vessel.

SUMMARY OF THE INVENTION

According to a first aspect of the present invention, there is provided a position reference sensor comprising an optical assembly including:
  a pulsed laser device for emitting laser light;
  a lens arrangement comprising a lenticular lens for producing a vertically fanned beam of the laser light emitted by the pulsed laser device; and
  a photodiode comprising a plurality of photodetectors for detecting laser light reflected by a retro-reflective target, the level of reflected laser light incident upon each photodetector being individually detectable;
  the position reference sensor further comprising an actuator for varying the inclination of the optical assembly, the actuator being automatically controllable based on the level of reflected laser light incident upon each photodetector.

The ideal position of a retro-reflective target is at the vertical centre of the vertically fanned beam of laser light so that in the event of pitch, roll or heave motion of a marine vessel including the position reference sensor, the retro-reflective target will remain in the field of illumination of the vertically fanned beam. The level of reflected laser light incident upon each photodetector can be used to determine the vertical position of a retro-reflective target relative to the centre line of the vertically fanned beam and the actuator can, thus, be controlled to vary the inclination of the optical assembly so that the retro-reflective target is positioned substantially at the centre of the vertically fanned beam and so that the reflected laser light can be detected by the photodiode. The lenticular lens advantageously maximises the uniformity of the output signal amplitude of the vertically fanned beam, further improving the automatic inclination control provided by the actuator.

The term 'pulsed laser device' as used throughout this specification is intended to include a laser device which is operated in any suitable manner such that its output amplitude varies over time. The term 'pulsed laser device' as used herein may, therefore, encompass a laser device whose output intensity is modulated in any suitable way. The modulation could, for example, be in the form of alternating 'on' and 'off' periods or in accordance with a suitable mark-space ratio, such as a 50:50 mark-space ratio.

The optical assembly may be operable to convert the reflected laser light incident upon each photodetector into a corresponding analogue voltage signal, and the magnitude of the corresponding analogue voltage signal is typically indicative of the level of reflected laser light incident upon the particular photodetector.

The individual analogue voltage signals may be processed to provide a position feedback control signal. For example, the position reference sensor may form part of a dynamic positioning system and the individual analogue voltage signals may thus be processed by the dynamic positioning system. The actuator used to tilt the optical assembly may, thus, be automatically controllable based on the position feedback control signal.

The discrete photodetectors may be in the form of a vertically arranged array. One or more photodetectors are typically located at the centre of the vertically arranged array and the actuator may be automatically controllable to vary the inclination of the optical assembly so that the maximum level of reflected laser light is incident upon the one or more discrete photodetectors located at the centre of the vertically arranged array. As explained above, this increases the likelihood that the one or more retro-reflective targets will remain within the field of illumination of the vertically fanned beam of laser light in the event of pitch, roll or heave motion of the marine vessel.

At least three photodetectors are typically provided in the vertically arranged array. The provision of at least three photodetectors allows the position of the retro-reflective target in the field of illumination of the vertically fanned beam to be more accurately determined and thus enables the actuator to more accurately control the optical assembly to maintain the retro-reflective target towards the vertical centre of the field of illumination of the vertically fanned beam of laser light.

The lenticular lens may be a cylindrical lenticular lens and may comprise an array of cylindrical lenses whose individual optical outputs are superposed to produce the vertically fanned beam of laser light. The lens arrangement may include a first lens to spread the relatively narrow beam of laser light produced by the pulsed laser device and thereby provide a beam of laser light which extends across the lenticular lens in the vertical direction. The lenticular lens is typically located adjacent to the first lens so that the beam of laser light emanating from the first lens can be transmitted towards and through the lenticular lens to produce the vertically fanned beam of laser light.

The actuator may be a servomotor. The optical assembly may be enclosed in a housing which may be mounted, in use, on a marine vessel. The housing typically rotates about a generally vertical axis so that the vertically fanned beam of pulsed laser light can sequentially and repeatedly illuminate a series of horizontally spaced retro-reflective targets or indeed a single retro-reflective target. The housing may rotate continuously or may oscillate about the vertical axis.

According to a second aspect of the present invention, there is provided a dynamic positioning system for a marine vessel, the dynamic positioning system including a position reference sensor according to the first aspect of the present invention mounted on the marine vessel and being operable to determine the position of the marine vessel relative to one or more objects. Typically, the dynamic positioning system includes a processor which is operable to determine the position of the marine vessel by analysing laser light reflected onto the photodiode by one or more retro-reflective targets located on the one or more objects. The dynamic positioning system may be operable to determine the range and possibly also the relative heading between the marine vessel and the one or more objects on which the one or more retro-reflective targets are located.

According to a third aspect of the present invention, there is provided a method for operating a position reference sensor comprising an optical assembly including a pulsed laser device, a lens arrangement comprising a lenticular lens, and a photodiode comprising a plurality of photodetectors, wherein the method comprises:

producing a vertically fanned beam of laser light using the pulsed laser device and lens arrangement and directing the vertically fanned beam towards one or more retro-reflective targets;

detecting the level of reflected laser light incident upon each photodetector; and varying the inclination of the optical assembly, based on the detected level of reflected light incident upon each photodetector, by using an automatically controllable actuator.

The method may comprise converting the reflected laser light incident upon each photodetector into a corresponding analogue voltage signal, with the magnitude of the corresponding analogue voltage signal typically being indicative of the level of reflected laser light incident upon the particular photodetector.

The method may comprise processing the individual analogue voltage signals to provide a position feedback control signal and the method may comprise automatically controlling the actuator based on the position feedback control signal.

The photodetectors may comprise a vertically arranged array and the method may thus comprise automatically controlling the actuator to vary the inclination of the optical assembly so that the maximum level of reflected laser light is incident upon one or more of the photodetectors at the centre of the vertically arranged array.

DRAWINGS

DETAILED DESCRIPTION OF EMBODIMENTS OF THE INVENTION

Figure 1:
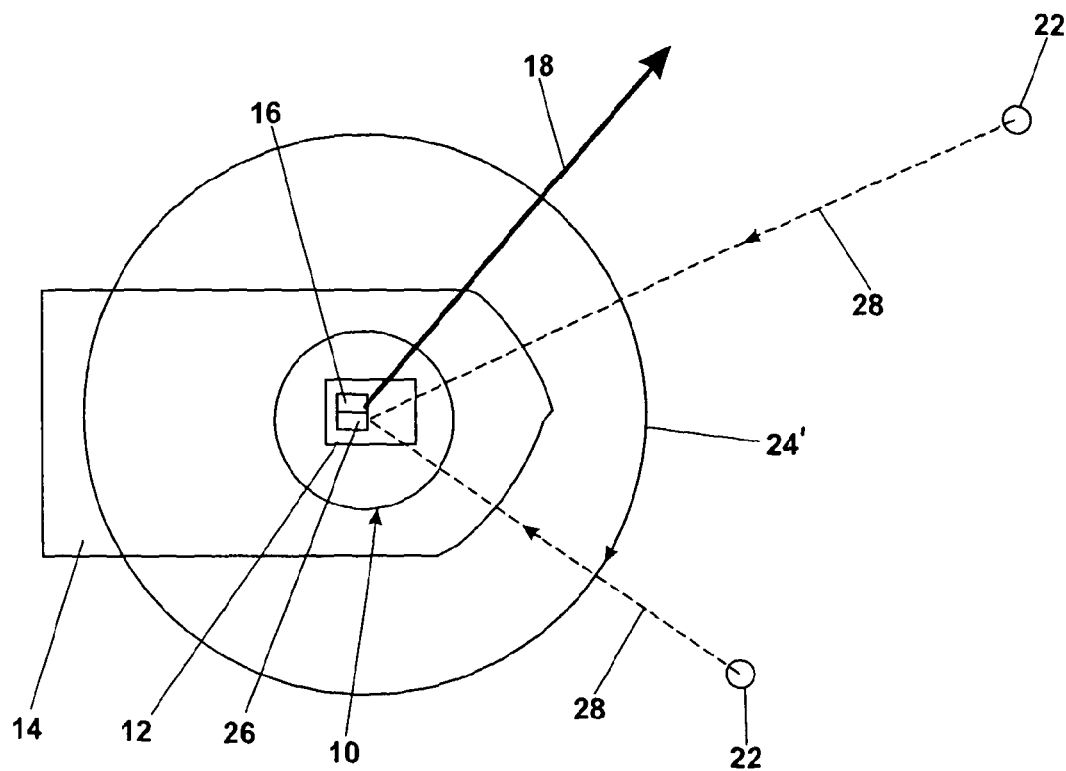
FIGS. 1 and 2 are diagrammatic illustrations in the horizontal and vertical planes respectively showing the basic principle of operation of a known position reference sensor.

Embodiments of the present invention will now be described by way of example only and with reference to the accompanying drawings, noting that the basic principles of operation of the position reference sensor according to the present invention are the same as those of the position reference sensor 10 described above with reference to FIGS. 1 and 2. The description above is, therefore, incorporated herein in its entirety and corresponding reference numerals will be used when referring to the corresponding components of the position reference sensor according to the present invention.

Figure 3:
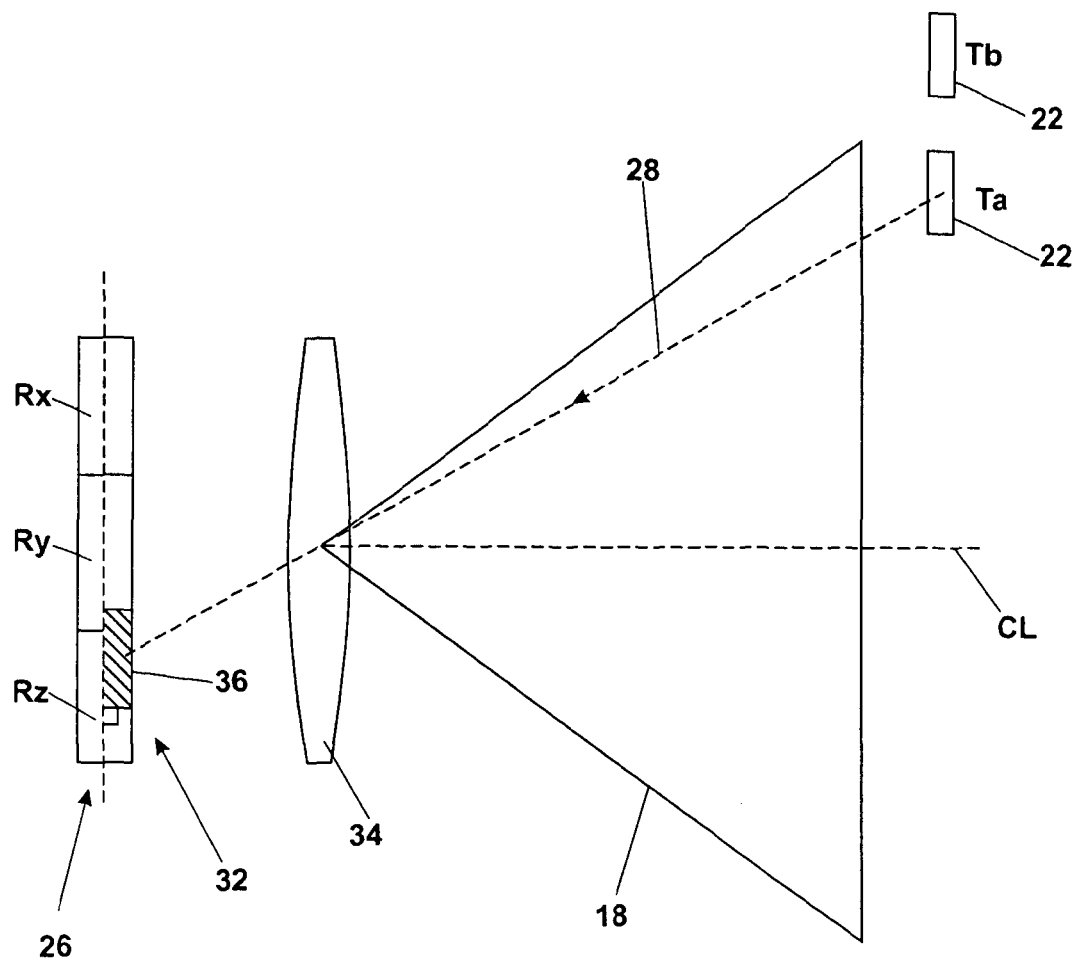
FIG. 3 is a diagrammatic illustration of part of a position reference sensor according to the present invention.

Referring to FIG. 3, the position reference sensor includes a photodiode 32 comprising three discrete photodetectors Rx, Ry, Rz which are located adjacent to each other and which together form a vertically arranged array. A lens 34 is located adjacent to the photodiode 32 and focuses reflected laser light 28 onto the photodiode 32. The photodiode 32 and associated lens 34 form part of the optical assembly 12 along with the pulsed laser device 16 and its associated optics.

An actuator, for example in the form of a servomotor, is provided to vary the inclination of the optical assembly 12. In accordance with aspects of the invention, the level of reflected laser light 28 incident upon each of the discrete photodetectors Rx, Ry, Rz is automatically detected and the actuator is automatically controlled based on the detected level of reflected laser light incident upon each photodetector Rx, Ry, Rz to vary the inclination of the optical assembly 12, and thereby vary the inclination of the of the vertically fanned beam 18 of laser light emitted by the pulsed laser device 16. This enables the position reference sensor according to the invention to compensate for dynamic motion of the marine vessel 14 and the position reference sensor is, thus, able to maintain the retro-reflective targets within the effective field of illumination of the vertically fanned beam 18 of laser light and within the detection plane of the photodiode 32.

In an illustrative example, described with reference to FIG. 3, a retro-reflective target 22 is positioned on an object such that it is at the upper extremity of the effective field of illumination of the vertically fanned beam 18 of laser light, in the position denoted Ta. This position is not ideal because if the marine vessel 14 was subjected to downward motion, resulting from one or more of pitch, roll and heave as caused by the prevailing sea state, the retro-reflective target 22 could move to a position outside the field of illumination of the vertically fanned beam 18 of laser light and also outside the detection plane of the photodiode 32. This is shown diagrammatically as position Tb.

The optimum position for the retro-reflective target 22 would be substantially in line with the centreline CL of the vertically fanned beam 18 of laser light, so that the retro-reflective target 22 would remain within the field of illumination of the vertically fanned beam 18 of laser light and within the detection plane of the photodiode 32 in the event of downward motion of the marine vessel 14. In this optimum position, the laser light reflected by the retro-reflective target 22 would be incident upon only the discrete photodetector Ry at the centre of the array. This optimal illumination of the photodetectors Rx, Ry, Rz, which corresponds to the optimal positioning of the retro-reflective target 22, is thus used to control the inclination of the optical assembly 12 in which the pulsed laser device 16 and its associated optics and the photodiode 32 and its associated lens 34 are housed.

In typical embodiments of the invention, the level of reflected laser light 28 incident upon each photodetector Rx, Ry, Rz is converted into a corresponding analogue voltage signal, and each analogue voltage signal is proportional to the level of light incident upon that particular photodetector. For example, when the retro-reflective target 22 is in the position Ta illustrated in FIG. 3 and produces the reflected image 36 on the photodiode 32, it will be seen that photodetector Rx will produce 0% of the total voltage signal, photodetector Ry will produce approximately 20% of the total voltage signal and photodetector Rz will produce approximately 80% of the total voltage signal. On the other hand, if the retro-reflective target 22 was in its optimum position, in line with the centre line CL of the vertically fanned beam 18 of laser light, photodetectors Rx and Rz would both produce 0% of the total voltage signal whilst photodetector Ry, at the centre of the array, would produce 100% of the total voltage signal. It is based on these ideal voltage signals that the position reference sensor can automatically control the actuator to vary the inclination of the optical assembly 12 to provide the aforesaid optimum voltage signal on each photodetector Rx, Ry, Rz, thereby optimising the position of the vertically fanned beam 18 of laser light so that the retro-reflective target 22 is substantially in line with the centre line CL of the vertically fanned beam 18 of laser light.

In some embodiments, the individual analogue voltage signals are processed to provide a position feedback control signal, and the position feedback control signal is used by the position reference sensor to automatically control the operation of the actuator to optimise the inclination of the optical assembly. In practice, the prevailing sea state is constantly changing and the instantaneous analogue voltage signals are, therefore, continuously measured and processed to provide an instantaneous position feedback control signal. The inclination of the optical assembly 12 can therefore be continuously varied as needed to take account of the prevailing sea state and any resulting dynamic motion of the marine vessel 14.

Figure 2:
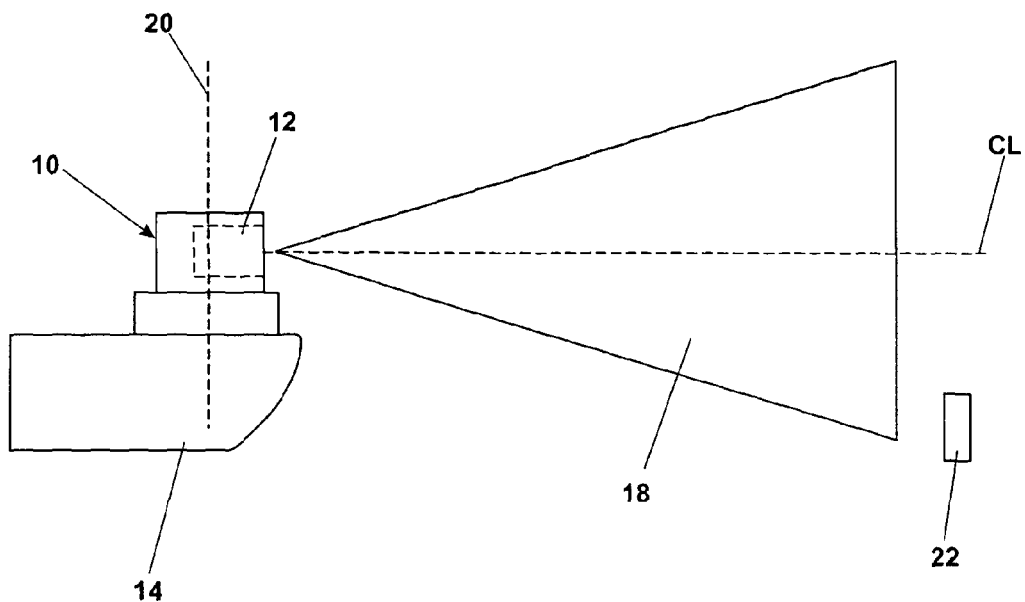
Figure 4:
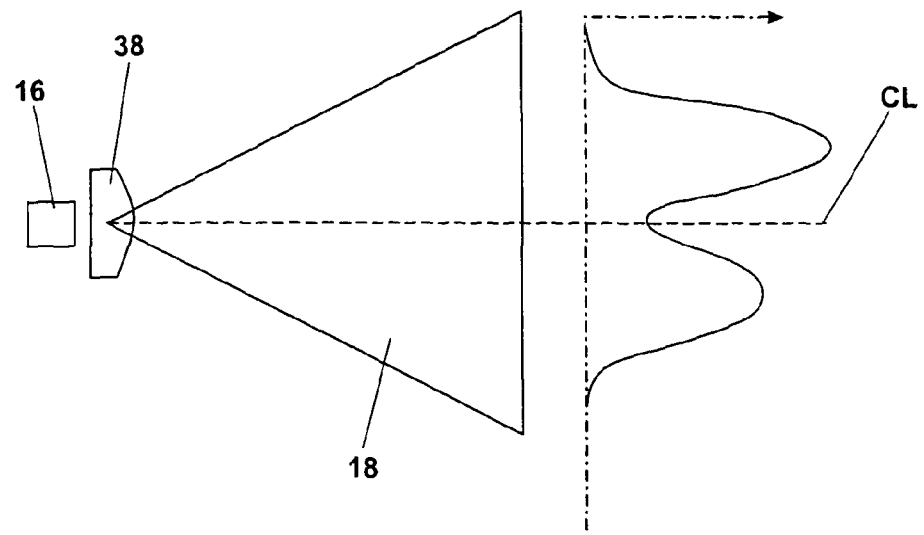
FIG. 4 is a diagrammatic illustration showing further detail of the known position reference sensor of FIGS. 1 and 2.

Referring now to FIG. 4 which illustrates further detail of the known position reference sensor 10 of FIGS. 1 and 2, it will be seen that the optics associated with the pulsed laser device 16 (typically a semiconductor laser) comprise a single cylindrical lens 38 for producing the vertically fanned beam 18 of laser light. A typical example of the output signal amplitude produced by the pulsed laser device 16 and associated cylindrical lens 38 is also illustrated in FIG. 4, from which it will be readily appreciated that the output signal amplitude is non-uniform in the vertical plane, with the minimum signal amplitude occurring close to the centre line CL of the vertically fanned beam 18 of laser light and the maximum signal amplitudes occurring either side of the centre line CL. This is problematic because even though a retro-reflective target 22 may be in the optimum position in line with the centre line CL of the vertically fanned beam 18, the maximum level of reflected energy may not be incident upon the centre photodetector Ry in the arrangement illustrated in FIG. 3 due to the offset nature of the peak signal amplitudes.

Figure 5:
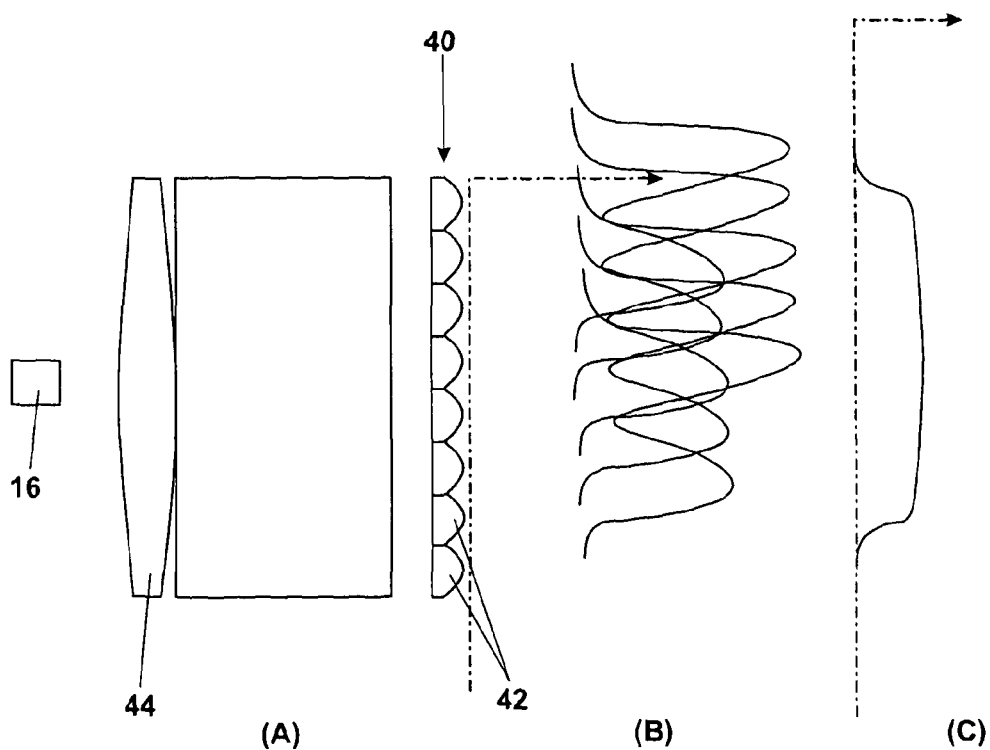
FIG. 5a is a diagrammatic illustration of the lens arrangement forming part of the position reference sensor according to the present invention.
FIGS. 5b and 5c are diagrammatic illustrations of the output signal amplitudes of the lens arrangement.

In order to overcome this problem, the optical assembly 12 of the position reference sensor according to the present invention includes a lens arrangement comprising a cylindrical lenticular lens 40, as shown in FIG. 5a. The cylindrical lenticular lens 40 comprises a plurality of individual cylindrical lenses 42 which are formed as a single integral moulding.

It will be seen in FIG. 5b that each of the cylindrical lenses 42 forming the cylindrical lenticular lens 40 produces its own characteristic output signal. However, the cylindrical lenticular lens 40 superposes the individual optical outputs of the individual cylindrical lenses 42 to produce a resultant output signal amplitude which is uniform across the lenticular lens 40 and which has no peaks or troughs, as illustrated in FIG. 5c.

In the embodiment illustrated in FIG. 5a, the lens arrangement additionally comprises a first lens 44 which is positioned adjacent to the cylindrical lenticular lens 40 and which provides a parallel beam of laser light extending across the entire width of the lenticular lens 40 in the vertical direction. The parallel beam is transmitted towards and through the cylindrical lenticular lens 40 to provide the vertically fanned beam 18 of laser light.

Although embodiments of the invention have been described in the preceding paragraphs with reference to various examples, it should be understood that various modifications may be made to those examples without departing from the scope of the present invention, as claimed.

For example, although the illustrated photodiode 32 comprises three photodetectors, more than three photodetectors can be provided. An actuator other than a servomotor may be used to control the inclination of the optical assembly 12.

The invention claimed is:

1. A position reference sensor comprising an optical assembly including:
    a pulsed laser device for emitting laser light;
    a lens arrangement comprising a lenticular lens for producing a vertically fanned beam of the laser light emitted by the pulsed laser device; and a plurality of photodiode photodetectors for detecting laser light reflected by a retro-reflective target, the level of reflected laser light incident upon each photodetector being individually detectable;

the position reference sensor further comprising an actuator for varying the inclination of the optical assembly, the actuator being automatically controllable based on the level of reflected laser light incident upon each photodetector.

2. A position reference sensor according to claim 1, wherein the optical assembly is operable to convert the reflected laser light incident upon each photodetector into a corresponding analog voltage signal, the magnitude of the corresponding analog voltage signal being indicative of the level of reflected laser light incident upon the particular photodetector.

3. A position reference sensor according to claim 2, wherein the individual analog voltage signals are processed, in use, to provide a position feedback control signal.

4. A position reference sensor according to claim 3, wherein the actuator is automatically controllable based on the position feedback control signal.

5. A position reference sensor according to claim 1, wherein the photodetectors are in the form of a vertically arranged array.

6. A position reference sensor according to claim 5, wherein the actuator is automatically controllable to vary the inclination of the optical assembly so that the maximum level of reflected laser light is incident upon one or more of the photodetectors at the center of the vertically arranged array.

7. A position reference sensor according to claim 5, wherein the number of photodetectors in the array is at least three.

8. A position reference sensor according to claim 1, wherein the lenticular lens comprises an array of cylindrical lenses whose individual optical outputs are superposed to produce the vertically fanned beam of laser light.

9. A position reference sensor according to claim 1, wherein the lens arrangement includes a first lens to provide a beam of laser light extending across the lenticular lens in the vertical direction for transmission towards and through the lenticular lens to produce the vertically fanned beam of laser light.

10. A position reference sensor according to claim 1, wherein the actuator is a servomotor.

11. A position reference sensor according to claim 1, wherein the optical assembly is enclosed in a housing mounted on a marine vessel and wherein the housing is adapted to rotate or oscillate about a generally vertical axis.

12. A dynamic positioning system for a marine vessel, the dynamic positioning system including a position reference sensor according to claim 1, mounted on the marine vessel and being operable to determine the position of the marine vessel relative to one or more objects.

13. A method for operating a position reference sensor comprising an optical assembly including a pulsed laser device, a lens arrangement comprising a lenticular lens, and a plurality of photodiode photodetectors, wherein the method comprises:

producing a vertically fanned beam of laser light using the pulsed laser device and lens arrangement and directing the vertically fanned beam towards one or more retro-reflective targets;

detecting the level of reflected laser light incident upon each photodetector; and varying the inclination of the optical assembly, based on the detected level of reflected light incident upon each photodetector, by using an automatically controllable actuator.

14. A method according to claim 13, wherein the method comprises converting the reflected laser light incident upon each photodetector into a corresponding analog voltage signal.

15. A method according to claim 14, wherein the method comprises processing the individual analog voltage signals to provide a position feedback control signal.

16. A method according to claim 15, wherein the method comprises automatically controlling the actuator based on the position feedback control signal.

17. A method according to claim 13, wherein the photodetectors are in the form of a vertically arranged array and the method comprises automatically controlling the actuator to vary the inclination of the optical assembly so that the maximum level of reflected laser light is incident upon one or more of the photodetectors at the center of the vertically arranged array.

* * * * *